April 13, 1943.　　　S. W. MARTIN　　　2,316,524
BALANCE TESTING DEVICE
Filed Jan. 17, 1940　　　2 Sheets-Sheet 1
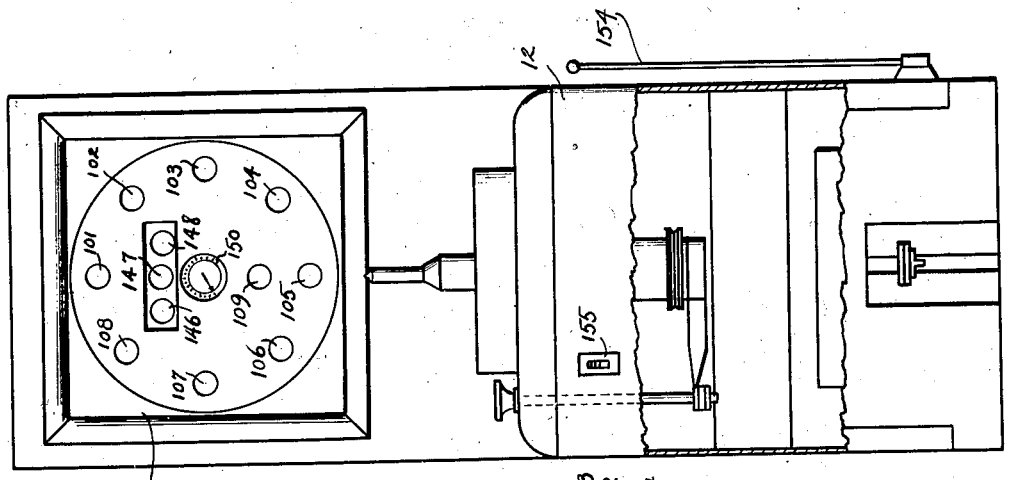
INVENTOR.
SIDNEY W. MARTIN
BY
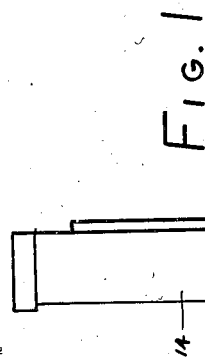
ATTORNEY.

April 13, 1943.  S. W. MARTIN  2,316,524
BALANCE TESTING DEVICE
Filed Jan. 17, 1940  2 Sheets-Sheet 2
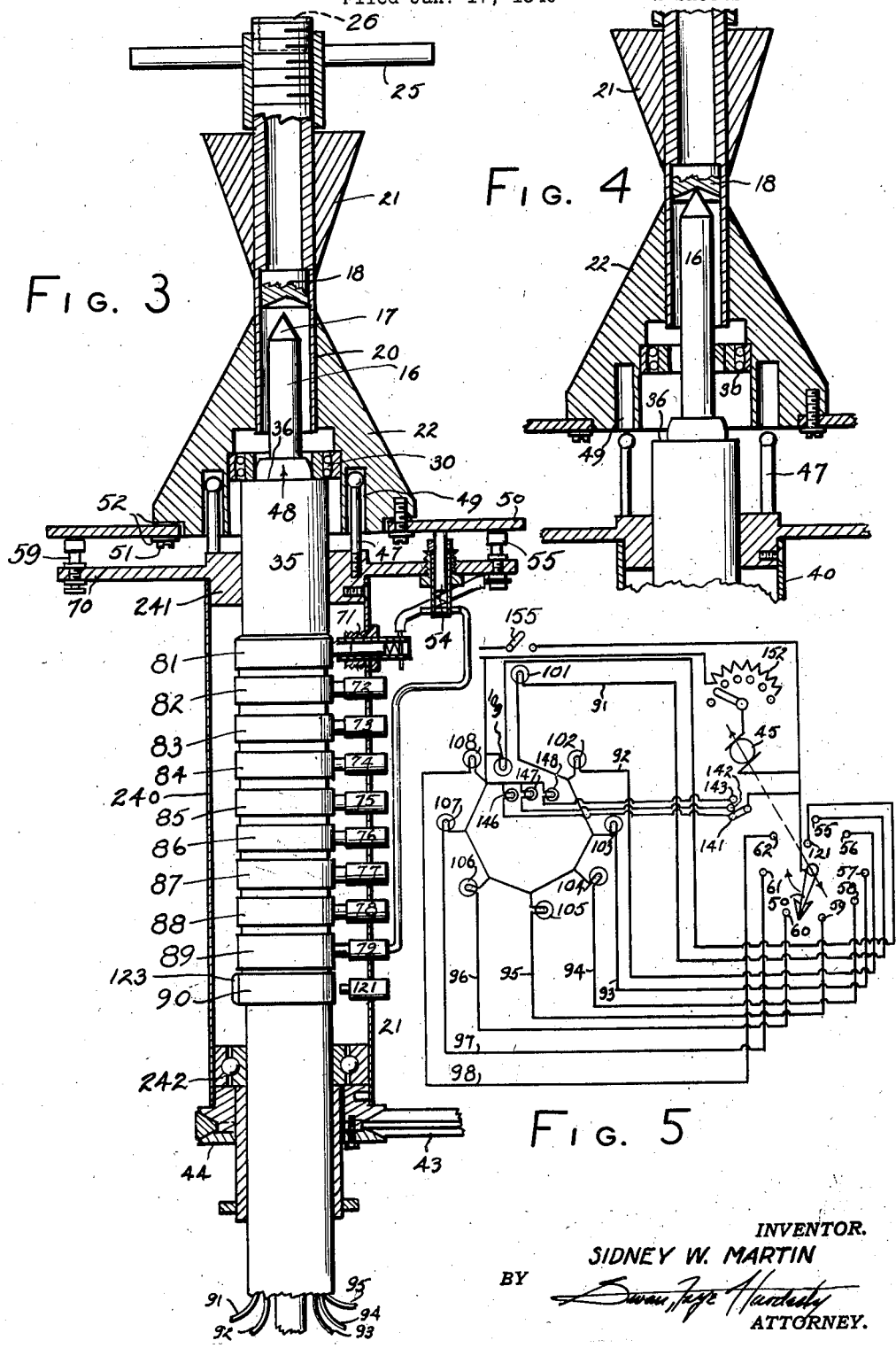
INVENTOR.
SIDNEY W. MARTIN
BY
ATTORNEY.

Patented Apr. 13, 1943

2,316,524

UNITED STATES PATENT OFFICE 2,316,524

BALANCE TESTING DEVICE

Sidney W. Martin, Chicago, Ill.

Application January 17, 1940, Serial No. 314,192

8 Claims. (Cl. 73—53)

This invention relates to balance testing apparatus, and particularly to improved and simplified means for determining conditions of unbalance in rotating masses, such as vehicle wheels.

An important object of the invention is to provide such a device which is so simple to operate that it requires little or no skill to handle, which indicates both static and dynamic unbalance, and which locates misplaced masses creating unbalanced conditions and, further, gives direct indication of extent of such unbalance, and of the amount as well as the location of the weight required to correct it.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a side elevational view, with the casing partly broken away, of a balance-indicating machine constructed in accordance with the principles of the present invention.

Figure 2 is a front elevational view thereof, also with the casing partly broken away.

Figure 3 is a longitudinal substantially diametric cross section of the supporting and driving assembly for the wheel or other object to be tested, showing the parts in the positions they occupy during dynamic balancing.

Figure 4 is a view similar to Figure 3, of the upper portion only of the supporting and driving assembly, showing the parts in the positions they occupy during static balancing.

Figure 5 is a schematic diagram of the electric circuit.

Referring now to the drawings:

Reference character 10 designates the frame of my improved machine, which is enclosed in a sheet metal casing, 12, and provided with an instrument panel 14 upstanding at the rear and readily visible from the front of the machine, where the operator ordinarily stands.

The wheel to be tested is arranged to be supported over the machine on a vertical axis. During static balancing, the support is furnished by a spindle 16 mounted substantially in the center of the casing and projecting thereabove, having a pointed extremity 17 on which the wheel is supported and freely rockable during static balancing. The pointed upper extremity of the shaft is engageable in a bearing block 18 having a frusto-conical seat and which supports a wheel-carrying assembly composed of a pair of oppositely facing frusto-conic clamping members 21, 22. The upper clamping cone member 21 is vertically slidable to and from the lower cone member 22 along the tube 20 which carries the lower cone and the bearing block 18. The upper extremity of the tube 20 is threaded to receive a hand nut 25 by which cone 21 may be forced downwardly toward cone 22, or freed to allow removal thereof at will. Cone members 21, 22 are of sufficient size to engage and hold the hub 24 of a wheel placed therebetween, in the manner shown in Figure 1, when cone 21 is tightened to hold the wheel between them.

Shaft 16 is vertically movable in the tubular support 35 in which it is mounted. When the shaft is raised, as shown in Figure 4, member 22 and bearing 30 are lifted free of the tubular support 35, so that the wheel and its supporting assembly are carried entirely by the point 17, and may rock freely thereon. In the upper extremity of the tube 20 is a spirit level 26, such level consisting of a circular casing having a bubble which is adapted to be centered therein when the wheel is level.

When the spindle 16 is lowered, as shown in Figure 3, the support 22 and bearing 30 come to rest upon a shoulder 36 formed at the upper end of the tubular support 35. Support 35 is fixedly mounted in the frame 10, its upper extremity which fits within the bearing 30 being accurately sized to fit such bearing without play, and tapered to insure proper sliding of the bearing thereupon. The lower extremity of spindle 16 projects from the tubular support 35, and is engageable by the inner end of a lever 40 pivoted in the frame at 41 and carrying at its opposite extremity a foot pedal portion 42 which projects from the front of the casing in position to be conveniently manipulated by the operator. It is thus only necessary to step on the pedal to raise the spindle and the wheel for static balancing, and to release the pedal to lower the wheel to the position required for dynamic balancing. The ball bearing 30 has its outer race formed concentrically with a point (48) upon the axis of the spindle, so that when the latter is retracted and the wheel assembly accordingly supported entirely by such bearing, the assembly is still free to rock about such point. The dynamic balance point 48 is below the point of static balance and below the center of gravity of the wheel and support assembly.

A drive sleeve 240 encircles the support 35, being rotatable thereabout upon bearing portions 241, 242 and drivable through belt 43 and pulley 44 by a motor 45. Drive pins 47 project upwardly from the upper bearing portion 241 to positions near the balance point 48. The heads of the pins are somewhat enlarged and rounded, and the openings 49 in the cone 22 are larger than the heads of the pins. This will be seen to facilitate rocking. It will thus be seen that with the spindle lowered, the wheel may be driven by means of the motor 45, yet remain free to rock on the bearing 30 about point 48.

Since dynamic unbalance could not be satisfactorily indicated by the spirit level during such rotation of the wheel, electrical means are provided to indicate such unbalance. An abutment and contact disc 50, of brass or other suitable conducting material, is secured to but insulated from the cone 22, by screws 51 and interposed insulators 52. During operation of the dynamic balance indicating mechanism, current is constantly supplied to the plate 50 through a brush 54, while if the wheel and its supporting assembly rock sufficiently about bearing 30, due to dynamic unbalance, the plate engages one or more of the spaced contacts 55-62 inclusive, mounted on the thrust and contact plate 70 carried by bearing portion 241. The combined thrust portion and contact plate 70 is arranged directly beneath the disc 50 and also serves to support the brush 54. Each of the contacts 55-62, inclusive, is of course insulated, and the contacts are individually connected to brushes 71-78, inclusive, respectively. The brushes provide electrical connection with slip rings 81-88, inclusive. From the slip rings, wires 91-98, inclusive, connect to lamp bulbs, designated 101 to 108, inclusive, which are mounted in position for ready observation upon the face of the instrument panel 14. Contacts 55-62 are evenly spaced, and it will readily be apparent that tilting of the plate to engage any one of these contacts results in illumination of the corresponding one of the bulbs 101-108 upon the instrument panel. These bulbs may be of different colors, and corresponding colored strips or other marks, as 111, may be painted upon the top of the housing, at angular spacings which conform to the spacing of the contacts 55-62. An index contact 121 carried by but insulated from the drive sleeve 240, and projecting inwardly therefrom, closes a circuit to an index bulb 109, also carried upon the instrument panel, whenever the wheel assembly is turned to a position which aligns the contacts 55-62, inclusive, with the several colored strips 111 which correspond to the colors of the bulbs to which the contacts are connected. Closure of the circuit to the index bulb may be effected by a cam lobe 123 carried by contact ring 90 mounted on the tubular support, and which completes the circuit to contact 121 only when the parts are so aligned. The return connection to brush 54 is provided by another contact ring 89 and contact 79.

In order to test for dynamic balance, the switch 155 is closed and the wheel is rotated through the driving means previously described. If one or more, but less than all of the bulbs 101-108 are illuminated, due to sufficient unbalance of the wheel to cause the plate 50 to rock until the corresponding contacts are closed, the point of such dip may be determined by noting the color of the light or lights which are illuminated, and then stopping the wheel, aligning the contacts by means of the index lamp in the manner described, and marking the wheel at the point of the corresponding colored strips 111, to indicate the point of unbalance. Or, if desired, with or without such marking, weights may be attached to the wheel at the point or points thus determined, to correct the unbalance.

Means are also provided to indicate the extent of the unbalance condition, and the approximate weight required to correct it. This consists of means for raising the plate 70 toward the disc 50, and for measuring by suitable indicating means the amount of effort to raise the plate until the wheel is leveled despite its unbalanced condition. Attainment of the level position by the rotating wheel is indicated by illumination of all of the bulbs 101-108, and during the test the wheel is kept turning at constant speed, a speed controller in the form of a variable resistance 152 for the motor 45, and a speedometer 150 operable by the driving sleeve, being provided to enable such speed control.

Plate 70 is lifted by raising the driving sleeve 240, by means of a yoke 130 pivoted inside the casing and adapted to bear upwardly against the bottom of the pulley 44. A knob 132 mounted on top of the casing and connected to the lifting yoke by a rod 133 enables the plate 70 to be lifted at will. A spring 135 is interposed between the rod 133 and yoke 130, and the extension of the spring serves as a measure of force required to lift the yoke. A series of electrical contacts 141, 142, 143 carried by but insulated from the frame is progressively engageable with a contact 144 carried by the rod, the latter being mounted in the casing in appropriate position, as shown in Figure 1. Contacts 141, 142, 143 are connected, respectively, to bulbs 146, 147, 148 mounted upon the instrument panel. These bulbs may be designated "light," "medium" and "heavy," respectively, to indicate the extent of unbalance, and accordingly the size of the required weight. The weights may be of standardized proportions to correspond to these indications.

The variable resistance 152 is regulable by means of a handle 154 projecting from the side of the casing and switch 155 is also conveniently mounted on the front of the casing.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

I claim:

1. Means for balancing a wheel or the like, including a standard, a wheel support rotatable thereupon and universally rockable about a desired center, means for rotating the wheel and support without preventing rocking thereof about such center, and means for locating dynamic unbalance during rotation of the wheel, comprising a plurality of angularly spaced contacts rotatable with the support and closable by tilting of the latter, a plurality of indicating devices to which said contacts are individually electrically connected, whereby said indicating devices are individually actuable, each in response to tilting of the wheel about a different transverse axis, and indexing means for indicating which of said contacts, and which corresponding portion of the wheel, is represented by each of said indicating means.

2. In a balancing device of the character described, in combination with a stand, bearing means carried thereby, a support mounted on said bearing means for rotating and tilting movement, means for mounting an object to be tested upon said support, means for rotating said support without preventing tilting thereof, electrically operable indicating means for indicating at a point remote from said support dynamic unbalance of an object carried by the support, said electrically operable means including contact means rotatable and tiltable with the object being tested, cooperating contact means also rotatable with such object but held against tilting therewith, and indicating means connected to said contact means for indicating the axis of any tilting resulting from dynamic unbalance of the object.

3. In a balancing device of the character described, in combination with a stand, a universally rockable bearing portion carried thereby, a support carried by said bearing portion, means for rotating said support without preventing rocking thereof, means for securing a wheel to said support, a plurality of angularly spaced contact portions rotatable in synchronism with said support and individually operable in response to rocking thereof about different transverse axes, and an indicating device actuable in response to closing of each of said contact portions, whereby operation of any one of said contacts actuates one of said indicating means individually, to designate the axis about which rocking due to dynamic unbalance occurs.

4. Means as set forth in claim 3 including means for forcing said wheel, against the effort of said dynamic unbalance and while rotating, toward a position perpendicular to the axis of rotation, and means for measuring the effort required to so move the wheel.

5. Means for testing dynamic balance of an object with respect to a desired axis of rotation, comprising a stand, bearing means carried by the stand, a support for the object under test mounted upon said bearing means for rotating and rocking movement, a substantially flat contact plate carried by said support in position to project substantially perpendicularly from the desired axis of rotation of the object, a plurality of cooperating contact means spaced from but engagable by said contact plate when the latter rocks due to dynamic unbalance of the object under test, said cooperating contact means being rotatable synchronously with the object under test, different ones of said contact means being closable in response to rocking of the plate about different transverse axes, and indicating means connected to said contacts to indicate the axis of rocking.

6. In a dynamic balancing device, in combination with a stand, means for supporting an object to be tested thereupon for rotating and tilting movement, means for rotating such object without preventing tilting thereof, an abutment portion rotatable with the object and perpendicular to its intended axis of rotation, a pressure portion also rotatable with said object and movable to and from engagement with said abutment portion but rigidly held in perpendicular relation to the axis of the stand, a plurality of electric contact means carried by one of said portions, circumferentially spaced there-around and rotatable with the support and actuable by tilting movement of the abutment portion with respect to said axis and pressure portion, and means for urging the pressure portion axially toward the abutment portion while said object is rotating and without preventing rotation thereof, whereby the pressure portion opposes the tilting effort of any dynamic unbalance of the rotating object, regardless of the axis of such tilting effort, and means for measuring the force required to offset the force due to dynamic unbalance.

7. In a device for testing the dynamic balance of an object with respect to a desired axis of revolution, in combination with a stand, means for supporting such an object thereupon for revolving and tilting movement, means for revolving such object without preventing tilting thereof, means including a thrust portion movable to and from operative engagement with the support for such object in a position normal to said desired axis, while the object is revolving and without preventing driving thereof, means for forcing the thrust portion toward the proper plane of revolution of the object under test, to oppose the tilting effort exerted by any dynamic unbalance thereof, including actuating means for so moving said thrust portion, and scale means for indicating the effort required to offset the force created by any such dynamic unbalance.

8. In a balancing device of the character described, in combination with a stand, a rockable and rotatable bearing portion carried thereby, a supporting device carried by and rockable and rotatable with respect to said bearing portion, means for rotating said support without preventing rocking thereof, means for securing a wheel or the like to said support, a plurality of angularly spaced contact portions individually operable in response to rocking of said support about different transverse axes, means carrying said contact portions and rotatable with said support but held against rocking therewith, an indicating device actuable in response to closing of each of said contact portions, whereby operation of any one of said contacts actuates one of said indicating means individually, to designate the axis about which rocking due to dynamic unbalance occurs, indexing means for indicating the location of the axis of rocking movement, means for opposing the rocking effort resulting from dynamic unbalance by a measurable force, to determine the extent of such dynamic unbalance, and means for indicating and means for controlling the speed of rotation of the support without interfering with the drive thereof.

SIDNEY W. MARTIN.